United States Patent [19]

Tuttle

[11] 4,140,868
[45] Feb. 20, 1979

[54] VIBRATION DAMPER FOR CABLES

[76] Inventor: Paul D. Tuttle, 704 Bergstrom Pl., Marshall, Tex. 75670

[21] Appl. No.: 829,943

[22] Filed: Sep. 1, 1977

[51] Int. Cl.² ............................................. H02G 7/14
[52] U.S. Cl. ..................................... 174/42; 188/1 B; 267/136
[58] Field of Search .................. 174/42; 188/1 B, 266; 248/358 AA; 267/136, 178

[56] References Cited

U.S. PATENT DOCUMENTS

| 2,132,319 | 10/1938 | Preiswerk | 174/42 |
| 3,474,184 | 10/1969 | Crosby et al. | 174/42 |
| 3,906,143 | 9/1975 | Leblanc | 174/42 |

FOREIGN PATENT DOCUMENTS 703042  2/1931  France ........................................ 174/42

Primary Examiner—Laramie E. Askin
Attorney, Agent, or Firm—Oblon, Fisher, Spivak, McClelland & Maier

[57] ABSTRACT

A vibration damper for cables utilizing the frictional properties of a close-wound spiral spring, that is, a spring wound in spiral form from a flat strip and having contacting faces. Vibrational energy is dissipated in the spiral spring by the lateral motion of the turns of the spring relative to one another. Typically, two spiral springs are contained in a housing suspended from a cable conductor. The housing of the device including such supplementary weight as required by the design forms an inertial mass which tends to remain fixed in space. During vibration of the cable, the turns of the spring are forced to move up and down against each other and the frictional resistance to their motion dissipates the vibrational energy in the cable, thereby reducing the vibration amplitude to a safe low level.

12 Claims, 10 Drawing Figures

METAL OR NON-METALLIC MATERIAL WITH METALLIZED SURFACE

VIBRATION DAMPER FOR CABLES

BACKGROUND OF THE INVENTION

1. Field of the Invention

The present invention relates generally to a vibration damper for damping the vibration of a suspended cable and more particularly to a vibration damper in which a spring is effective to damp vibrations of the suspended cable.

2. Description of the Prior Art

It is well known that suspended cables are subjected to air currents moving across them which tend to move and vibrate the cables. If the period of vibration caused by air currents moving across a cable coincides with its natural period of oscillation or a harmonic thereof, the cable is then subjected to a sustained mechanical vibration which causes a continuously repeated bending of the cable at its support locations. Such bending causes fatigue of the metal of the cable resulting in failure of the cable at the support locations. Further, such cable movement causes wear on its associated and supporting hardware.

Thus, the importance of preventing vibration as a means of eliminating excessive wear and fatigue of cables is well recognized. Damping by introduction of frictional forces to reduce the vibration amplitude has long been applied and many damper designs have been used.

BRIEF SUMMARY OF THE INVENTION

Accordingly, it is an object of this invention to provide an improved vibration damper wherein damping is effected by frictional forces.

A vibration damper for a suspended cable according to this invention comprises an inertia member, a cable clamping member, and at least one close-wound spiral spring mechanically coupling the cable clamping member to the inertia member.

The vibrational energy of the cable is dissipated in the form of heat generated by the frictional resistance of the spring's coils to their relative lateral displacement.

Since the spring is formed from a flat strip of elastic material wound in a spiral configuration with contacting faces, the frictional resistance can be varied by the simple expedient of bonding materials of known frictional property to one or both sides of the strip. This is an advantage not available with other types of springs, as for example, the helical spring discussed in my U.S. Pat. No. 3,617,609 issued Nov. 2, 1971, and results in a highly efficient damper.

Another advantage apart from the damping efficiency of the damper of this invention lies in the fact that the inertia member can be incorporated into or form a rugged electrostatic shield of weather housing. The effect of weathering and weather conditions on the damper's operation can therefore be minimized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENT AND AN ALTERNATE EMBODIMENT

Figure 1:
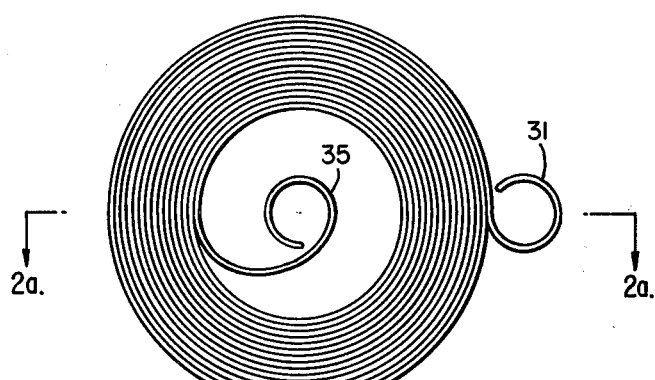
FIG. 1 is a plan view of a close-wound spiral spring.
Figure 2A:
FIGS. 2a and 2b are vertical cross-sectional views of a close-wound spiral spring at rest and deflected.
Figure 2B:

Referring now to the drawings, and more particularly to FIGS. 1 and 2, the principle of operation of the vibration damper of the invention is illustrated. The present invention is directed to the use of at least one close-wound spiral spring, that is, a spring consisting of a flat strip of elastic material wound in a spiral configuration with opposing faces in contact with one another, as the mechanism for damping vibrations of a suspended cable. An exemplary spiral spring is shown in plan view in FIG. 1 and in vertical cross-section in FIG. 2. Damping is accomplished by connecting the spring to the cable in such a manner that when the cable moves or vibrates, the coils of the spring undergo a lateral translation from the rest position shown in FIG. 2a to a deflected position as shown in FIG. 2b, i.e., the coils are translated in a direction parallel to the central axis of the spring. With the coils of the spring pressing against each other under an initial force and tension as manufactured, the lateral relative translation of adjacent coils provides friction therebetween which is highly effective in generating heat as a means for dissipating the energy of cable vibration. In this way, cable movement is rapidly stopped so that the wear and fatigue of the cable and its associated hardware including the damping springs themselves are reduced to negligible amounts.

Figure 3:
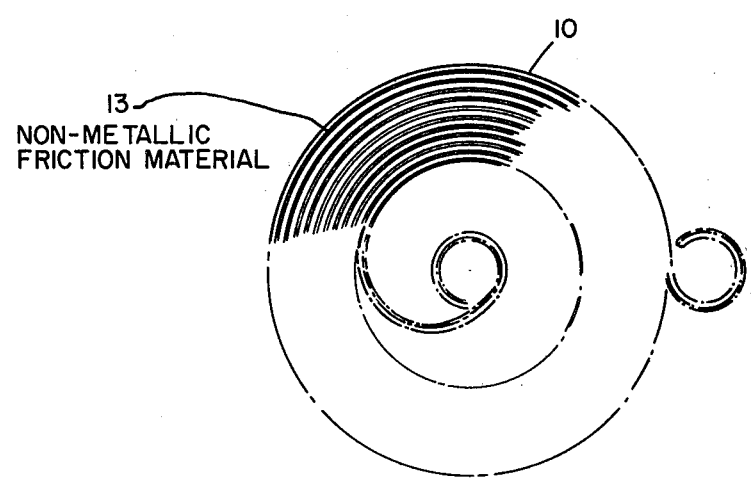
FIG. 3 is a plan view of a close-wound spiral spring with a non-metallic friction material bonded to one side of its coils.

Suitable springs can be wound from a variety of materials, the material chosen being dependent upon the environmental conditions to be withstood and campatibility with adjacent materials. Plastic materials can be used. However, in general those plastic materials having good friction will have high wear and those having low wear will have low friction. A metal spring will have metal-to-metal friction between turns. If this is undesirable, a non-metallic friction material can be bonded to one or both sides of the strip prior to forming it into a spring. In FIG. 3, a close-wound spiral spring 10 is shown in plan view with a non-metallic friction material 13 bonded to one side of its coils. The result is a friction device using a common principle, that of a non-metallic brake shoe against a metallic surface. This usually gives more controllable friction than a metal-to-metal friction pair. Materials bonded to both sides can be the same or different depending on the final friction characteristics desired. This possibility of incorporating special friction materials in the spring design is an advantage of the spiral spring concept over previous inventions.

Figure 4:
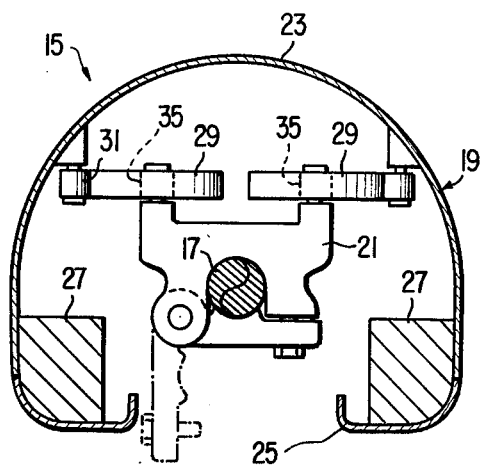
FIG. 4 is a vertical cross-sectional view of a first embodiment of the invention at rest.
Figure 5:
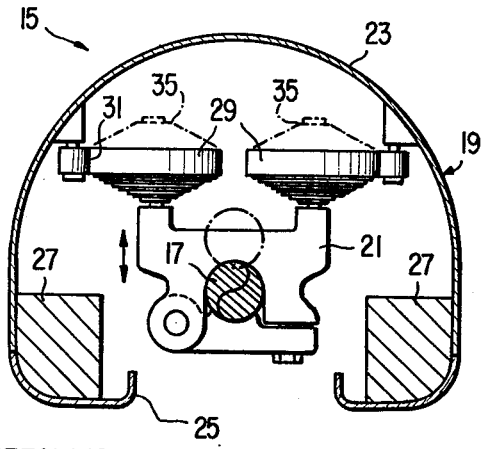
FIG. 5 is a vertical cross-sectional view of the first embodiment of the invention deflected.
Figure 6:
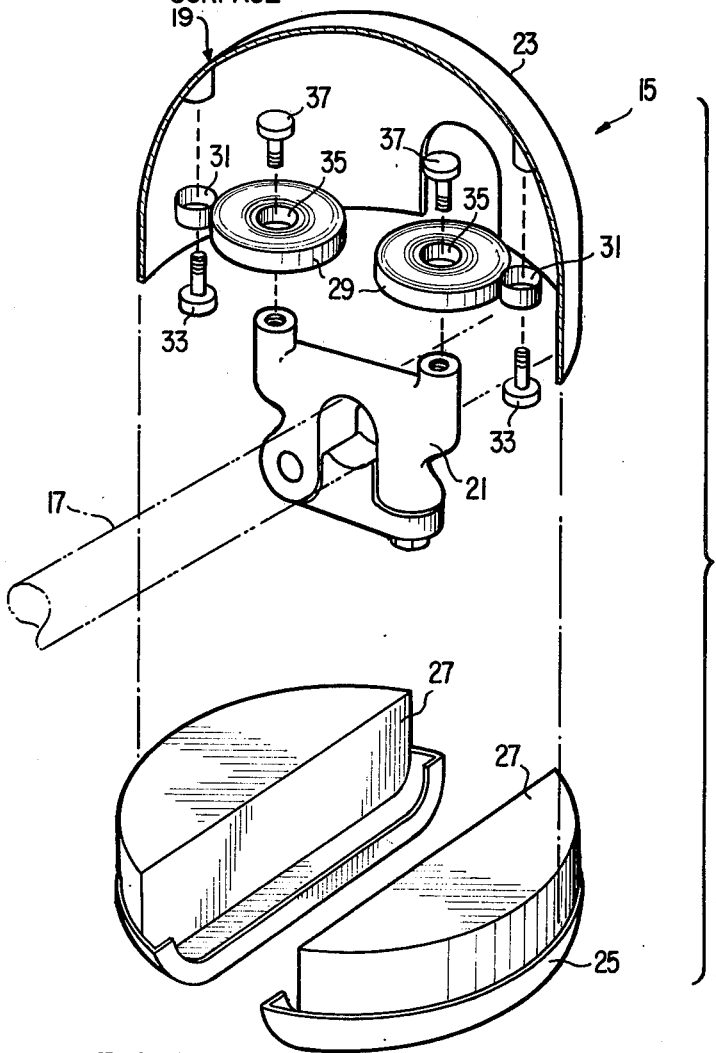
FIG. 6 is an exploded perspective view of the first embodiment of the invention.

Referring to FIGS. 4, 5 and 6, the numeral 15 generally refers to one embodiment of a vibration damper according to the invention. The vibration damper 15 is illustrated surrounding a cable 17. The vibration damper shown has been designed to suppress aeolian vibration. Aeolian vibrations exist substantially in a vertical plane, and are caused by alternate formation of eddy currents or vortices above and below the longitudinal axis of the cable at its leeward side.

The damper generally indicated by the numeral 15 includes a housing 19 and a clamping member 21 for clamping the housing to the cable. The housing is composed of cap 23, base 25 and inertial members 27. The base 25 is attached to the cap 23 by any conventional means and supports the weight of inertia members 27 whose function will be referred to later in greater detail. The clamping member 21 is suspended inside the housing from the cap 23 by two close-wound spiral springs 29. Each spring is on a vertical axis and has its outer end 31 connected to the cap 23 by means of a bolt 33 and its inner end 35 connected to the clamping member 21 by means of a bolt 37. The springs have a strength to maintain the clamping member 21, and thus the cable 17, fixed relative to the housing 19 under normal static conditions.

Referring to FIGS. 4 and 5, the principle of operation of the device will be described. Members 27 are inertia members, that is, they are designed to collectively have a mass related to the mass of a free loop length of vibrating cable that they are designed, in operation, to dampen, so that upon occurrence of aeolian vibration of the cable they will tend to maintain their position as the clamping member 21 tends to vibrate with the cable 17.

Let it be assumed that the cable 17 is in condition of aeolian vibration and is vibrating in the vertical direction. Thus, the clamping member 21 vibrates in a vertical direction as it follows the cable 17. FIG. 4 illustrates the rest position wherein the clamping member 21, and thus the cable 17, is maintained fixed relative to the housing 19. Referring to FIG. 5, let it be assumed that the first vibrational movement is in the downward direction. As the clamping member 21 moves downwardly under the influence of the downward movement of the cable, the inertial members 27 tend to maintain their position due to their mass. As they do so, the spacing between the clamping member 21 and the base 25 of the housing is reduced. With this change in position of the clamping member, the coils of the spiral springs 29 experience a lateral (i.e. downward) relative translation, and the frictional resistance of adjacent coils absorbs the energy of the applied vibration.

When the direction of movement of the cable 17 is reversed in an upward direction, the inertia members tend to maintain the lower position and the clamping member 21 moves upwardly to increase the spacing between it and the base 25. As this occurs, the coils of the spiral springs 29 experience a second lateral relative translation (i.e. in the upward direction). Here again, energy from the vibration is expended in work done against friction by the adjacent coils as they slide against one another.

Controlled frictional resistance of the spiral springs 29 dissipates energy and in so doing limits the rate at which the cable 17 can vibrate. The amount of energy dissipation is a function of the coefficient of friction between adjacent coils of the springs 29.

It will be appreciated that variation in the design is, of course, possible. Any number of identical or dissimilar spiral springs can be incorporated in the device depending on the results desired. In general, at least two springs will be found desirable in order to inhibit any unwanted spring motion, i.e., to restrict spring motion to the desired mode, that of lateral movement of the spring turns relative to each other.

The housing 19 protects the working part of the damper from the weather and inhibits the enclosing parts from causing undesirable corona. The housing 19 is preferably made of a formed metal, but it also can be fabricated from a thermoplastic resin, a thermosetting resin, or fibrous material or combination thereof and metallized on its inner surface in the embodiment of FIGS. 4, 5 and 6 because this embodiment employs inertia members 27 affixed to the housing. Metallization as an electrostatic shield is effective inside or outside the housing but is preferred inside so that it will maintain its integrity with exposure to the weather, i.e. will be most protected from degradation or deterioration by weather, dust, etc.

Figure 7:
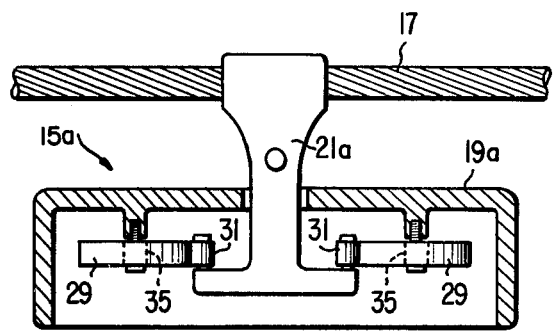
FIG. 7 is a vertical cross-sectional view of an alternate embodiment of the invention at rest.
Figure 8:
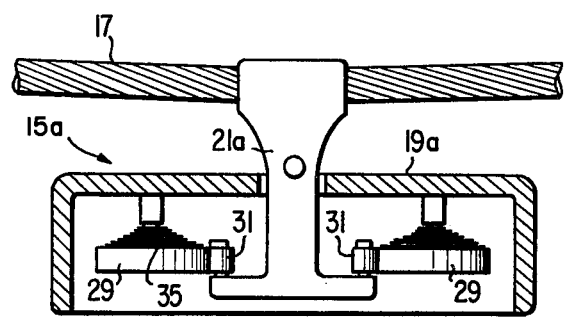
FIG. 8 is a vertical cross-sectional view of the alternate embodiment of the invention deflected.
Figure 9:
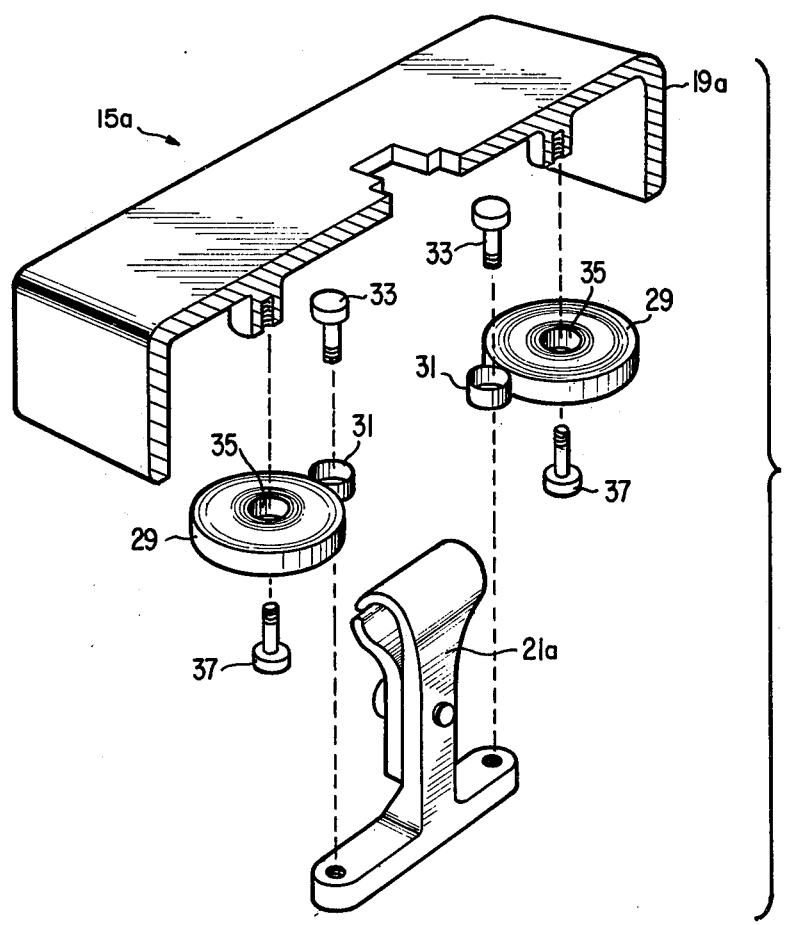
FIG. 9 is an exploded perspective view of the alternate embodiment of the invention.

FIGS. 7, 8 and 9 illustrate an alternative design wherein damping is achieved in the same general manner, i.e. the dissipation of energy of vibration in the frictional resistance of adjacent coils of a spiral spring.

In the case of the embodiment illustrated in FIGS. 7, 8 and 9, the vibration damper 15a is suspended from the cable 17. The damper 15a comprises a housing 19a and a clamping member 21a extending through a hole in the housing for clamping the housing to the cable 17. The housing 19a functions as the inertia member and its weight is supported by two close-wound spiral springs 29. Each spring is on a vertical axis and has its outer end 31 connected to the clamping member 21a by means of a bolt 33 and its inner end 35 connected to the housing 19a by means of a bolt 37. The springs have a strength to maintain the clamping member 21a, and thus cable 17, fixed relative to the housing 19a under normal static conditions.

The weight of the housing 19a is designed as indicated above, and under conditions of vibration the coils of the spiral spring 29 experience a lateral relative translation as the clamping member 21a moves with respect to the housing. The frictional resistance of the spiral springs 29 dissipates the energy of vibration and limits the rate at which the cable conductor to which the damper is mounted can vibrate.

In the embodiment of FIGS. 7, 8 and 9 the housing 19a is preferably fabricated as a bare cast metal conductive element e.g., of galvanized cast iron, to form an electrostatic shield.

Obviously, numerous modifications and variations of the present invention are possible in light of the above teachings. In establishing the design, the applicable consideration is the size of the cable to be damped and hence the magnitude of the vibrational energy to be dissipated. It is therefore to be understood that within the scope of the appended claims, the invention may be practiced otherwise than as specifically described herein.

What is claimed as new and desired to be secured by Letters Patent of the United States is:

1. A vibration damper for suspended cable comprising:
   an inertia member;
   a cable clamping member; and
   at least one close-wound spiral spring mechanically coupling the cable clamping member to the inertia member, said spiral spring having a plurality of generally concentrically disposed coils in frictional engagement;

whereby vibrational motion of said cable produces a relative motion between said spring coils such that the frictional engagement between adjacent coils results in dissipation of vibrational energy and dampening of said vibrational motion.

2. The vibration damper recited in claim 1 wherein the spiral spring has its outer end connected to the cable clamping member and its inner end connected to the inertia member.

3. The vibration damper recited in claim 1 wherein the spiral spring has its outer end connected to the inertia member and its inner end connected to the cable clamping member.

4. The vibration damper recited in claim 1 wherein the material of the spiral spring is a plastic.

5. The vibration damper recited in claim 1 wherein the material of the spiral spring is a metal.

6. The vibration damper recited in claim 1 wherein the material of the spring is a metal and a substance exhibiting a different coefficient of friction than that of the metal is bonded to at least one side of the coils of the spring.

7. The vibration damper recited in claim 1 wherein the inertia member is a housing.

8. The vibration damper recited in claim 7 wherein the housing is made of a metal.

9. The vibration damper recited in claim 7 wherein the housing is fabricated from an insulating material and is metallized on the inner surface thereof.

10. The vibration damper recited in claim 9 wherein the insulating material comprises a material from the group consisting of a thermoplastic resin, a thermosetting resin or fibrous material.

11. The vibration damper recited in claim 7 wherein the housing is fabricated from cast metal.

12. A vibration damper for suspended cable comprising:

an inertia member;

a cable clamping member;

at least one close-wound spiral spring mechanically coupling the cable clamping member to the inertia member; and, wherein said inertia member comprises a housing fabricated from an insulating material and is metallized on the inner surface thereof.

* * * * *